UNITED STATES PATENT OFFICE.

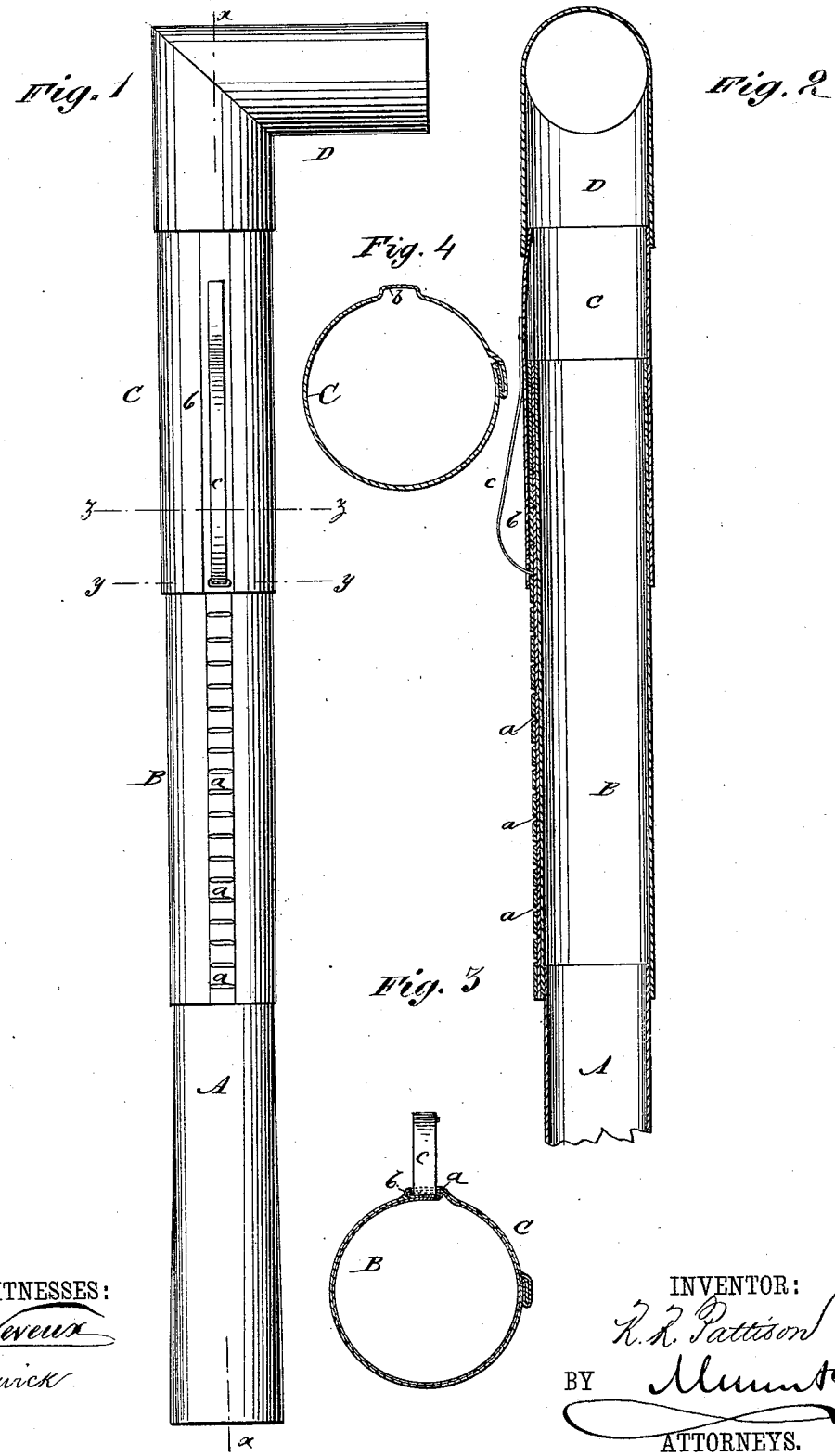

ROBERT R. PATTISON, OF TERRE HAUTE, INDIANA.

IMPROVEMENT IN EXTENSION STOVE-PIPES.

Specification forming part of Letters Patent No. 217,743, dated July 22, 1879; application filed April 18, 1879.

*To all whom it may concern:*

Be it known that I, ROBERT R. PATTISON, of Terre Haute, in the county of Vigo and State of Indiana, have invented a new and Improved Extension Stove-Pipe, of which the following is a specification.

The object of my invention is to obviate the difficulties usually experienced in jointing, setting, and adjusting lengths of stove-pipe. I make use of pipe in lengths, fitted together to move telescopically upon each other, and fitted with a spring-catch of peculiar construction, whereby the pipes are held securely in any position to which they are adjusted.

In the accompanying drawings, Figure 1 is an elevation, showing several lengths of pipe connected together and constructed in accordance with my invention. Fig. 2 is a vertical section on line $x\ x$ of Fig. 1. Fig. 3 is a cross-section on line $y\ y$. Fig. 4 is a cross-section on line $z\ z$, showing the groove in one section of the pipe.

Similar letters of reference indicate corresponding parts.

A B C are lengths of stove-pipe, attached together and to the elbow D, the lengths B C having my invention applied to them, so that by their adjustment the height of elbow D may be regulated as desired.

In long lines of pipes the adjustable joint may be applied at two or more points; but usually one adjustable joint is sufficient.

The length B is adapted for sliding within the length C, and the outer ends of both B and C are drawn in or formed tapering, so that they may be fitted to the usual lengths of pipe.

The folded seam of pipe B is formed with cross-indentations $a$, and pipe C is shaped to form a groove, $b$, for the folded seam of B, so that these pipes cannot turn upon each other.

Attached to the outside of pipe C is a flat steel spring, $c$, the moving end of which is bent of a shape to pass a slot in groove $b$ into the indentations $a$ of pipe B, and thereby prevent the pipe C from slipping down upon B.

By this construction the lengths B C can be adjusted to regulate the length of the whole pipe or the height of the elbow, and when adjusted the spring $c$ retains the parts in position.

To shorten the pipe, the spring $c$ will be disconnected by hand, pipe C drawn down to the desired point, and the spring-catch then allowed to spring back.

In lengthening, the pipes will be drawn out and the spring will pass over the indentations.

Having thus described my invention, I claim as new and desire to secure by Letters Patent—

The combination of the pipe B, provided with the folded and notched seam $a$, and the pipe C, provided with the groove $b$ and the spring $c$, substantially as and for the purpose set forth.

ROBERT RICHMOND PATTISON.

Witnesses:
 W. B. MANNING,
 GEO. SEYFERT, Jr.